US011235708B2

(12) United States Patent
Cha (10) Patent No.: US 11,235,708 B2
(45) Date of Patent: Feb. 1, 2022

(54) HEAD-UP DISPLAY FOR A VEHICLE

(71) Applicant: Steve Cha, Franklin Lakes, NJ (US)

(72) Inventor: Steve Cha, Franklin Lakes, NJ (US)

( * ) Notice: Subject to any disclaimer, the term of this patent is extended or adjusted under 35 U.S.C. 154(b) by 0 days.

(21) Appl. No.: 16/568,344

(22) Filed: Sep. 12, 2019

(65) Prior Publication Data

US 2020/0086806 A1 Mar. 19, 2020

Related U.S. Application Data (60) Provisional application No. 62/730,704, filed on Sep. 13, 2018.

(51) Int. Cl.
| | | |
|---|---|---|
| *B60R 11/02* | (2006.01) | |
| *B60K 37/00* | (2006.01) | |
| *G02B 27/01* | (2006.01) | |
| *B60R 1/00* | (2006.01) | |

(52) U.S. Cl.
CPC .......... *B60R 11/0229* (2013.01); *B60K 37/00* (2013.01); *G02B 27/0101* (2013.01); *G02B 27/0149* (2013.01); *B60K 2370/1529* (2019.05); *B60K 2370/166* (2019.05); *B60K 2370/177* (2019.05); *B60R 1/00* (2013.01); *B60R 2300/205* (2013.01); *B60R 2300/207* (2013.01); *B60R 2300/302* (2013.01); *B60R 2300/308* (2013.01)

(58) Field of Classification Search
CPC .......... B60R 11/0229; B60R 2300/207; B60R 2300/205; B60R 2300/30; B60R 2300/302; B60R 2300/307; B60R 2300/308; B60R 1/00; B60K 37/00; B60K 2370/1529; B60K 2370/166; B60K 2370/177; B60K 2370/563; B60K 2370/573; B60K 35/00; B60K 37/06; G02B 27/0149; G02B 27/0101; G02B 2027/0141; G02B 2027/0138; G02B 2027/014

See application file for complete search history.

(56) References Cited

U.S. PATENT DOCUMENTS

| | | | | |
|---|---|---|---|---|
| 2002/0141077 A1* | 10/2002 | Nakamura | ......... | G02B 27/0149 359/817 |
| 2009/0228204 A1* | 9/2009 | Zavoli | ...................... | G01S 19/49 701/532 |
| 2010/0253600 A1* | 10/2010 | Seder | ...................... | G02B 1/115 345/7 |
| 2019/0180485 A1* | 6/2019 | Kim | .......................... | B60R 1/00 |

* cited by examiner

*Primary Examiner* — Brian Wilson
(74) *Attorney, Agent, or Firm* — Cha & Reiter, LLC (57) ABSTRACT

Provided is a head-up display for a vehicle. The head-up display may include a camera configured to capture an image of a road ahead of the vehicle. The camera may further be configured to be in communication with a processor. The head-up display may also include a display in communication with the processor. The processor may be configured to select a route on a map between a current position of the vehicle and a destination selected by a user, receive the image from the camera, correlate the image to an area of the map, and control the display to display an indication indicating the route. Based on correlation of the image to the area of the map, the indication on the display may be substantially aligned with the road when viewed from front of the display. Other embodiments are disclosed and additional embodiments are also possible.

22 Claims, 5 Drawing Sheets

HEAD-UP DISPLAY FOR A VEHICLE

BACKGROUND

Technical Field

The instant disclosure generally relates to display technology and more particularly to a system and method for providing a head-up display displaying information in real time, such as driving directions and other notifications in a vehicle such as an automobile.

Description of the Related Art

Electronic devices such as smartphones and tablets recently have become ubiquitous. Taking advantage of these electronic devices having cellular data connections such as Long-Term Evolution (LTE) and location services such as Global Positioning System (GPS), these electronic devices are commonly used to provide driving directions, or turn-by-turn directions, to the user when the user is operating a motor vehicle, i.e. driving. Typically, in order to provide driving directions, these electronic devices would execute a maps application, such as Google Maps™ or the maps application on Apple Inc.'s iOS™ operating system. When these applications are executed, they typically display a screen on the display unit of the electronic device. The screen includes a map along with an indication indicating the route between the current position of the user or the vehicle and the destination selected by the user. When user action is required on the route, for example when the user needs to perform a right turn, the maps application will also typically output an audio prompt via the speaker of the electronic device.

In order to see the displayed screen of the maps application, users commonly mount the electronic device onto a surface of the vehicle using mounting devices so that the electronic device would remain upright and the user can view the display without having to hold the electronic device. Various mounting devices exist in the art, and they may be fixed to the windshield, the dashboard, or an air vent of the vehicle. But this creates a problem because when the electronic device is so mounted, it often is outside the user's field of view when driving. Therefore, when the user would like to see the indication indicating the route on the display of the electronic device, he or she generally would have to take his or her eyes off the road, which increases the risk of traffic accidents.

The audio prompts outputted by the maps application are designed to alleviate this problem, but they have their own shortcomings. Audio prompts can be drowned out by the radio, or by conversations between the passengers in the vehicle. This creates an undesirable scenario where if the user maintains his or her eyes on the road such that he or she cannot see the display of the electronic device, and if the user cannot clearly hear the audio prompt, he or she may fail to take the required action on the route, i.e. the user may miss the turn. This increases travel time and inconveniences the user. Further, another drawback of audio prompts during a GPS mode is that it interferes with the enjoyment of music since the audio prompts intrusively interrupts a playback in the middle of a song or during conversation with another passenger or other person during a speaker mode.

Therefore, it is desirable to provide a display displaying driving directions in the field of view of the user when driving so that the user does not need to take his or her eyes off the road while minimizing any fore-mentioned interruptions.

SUMMARY

As shown by the foregoing, a need has arisen for a display that can display driving directions in the field of view of the user when driving. Such a display is referred to herein as a "head-up display." Accordingly, one aspect of the disclosed invention is to provide a system and method for displaying driving directions and/or other information in a head-up display.

Further, it is another aspect of the disclosed invention to display the indication indicating a route on the head-up display such that the indication is substantially aligned with the road in front of the vehicle when viewed by the user as the user is driving. This may be done by including a camera in the head-up display. The camera may capture one or more images of the road ahead of the vehicle. These images may be processed by a processor so that they are correlated to an area of the map stored in the maps applications. Based on the correlation, the indication may be displayed at a particular location on the head-up display so that it is substantially aligned with the road ahead of the vehicle.

According to one embodiment disclosed in the instant disclosure, there is provided a head-up display for a vehicle. The head-up display may include a camera configured to capture an image of a road ahead of the vehicle. The camera may further be configured to be in communication with a processor. The head-up display may also include a display in communication with the processor. The processor may be configured to select a route on a map between a current position of the vehicle and a destination selected by a user, receive the image from the camera, correlate the image to an area of the map, and control the display to display an indication indicating the route or other notifications such as a desired venue or vendor. Based on correlation of the image to the area of the map, the indication on the display may be substantially aligned with the road when viewed from front of the display, i.e. when viewed by the user as the user is driving.

Other aspects and advantages of the instant disclosure will be apparent from the accompanying drawings, and the detailed description that follows.

BRIEF DESCRIPTION OF THE DRAWINGS

For a more complete understanding of the instant disclosure and the advantages thereof, reference is now made to the following description taken in conjunction with the accompanying drawings, wherein like reference numerals represent like parts, in which.

DETAILED DESCRIPTION

The following is a detailed description of certain embodiments chosen to provide illustrative examples of how the disclosed invention may preferably be implemented. The scope of the invention is not limited to the specific embodiments described herein.

Figure 1:
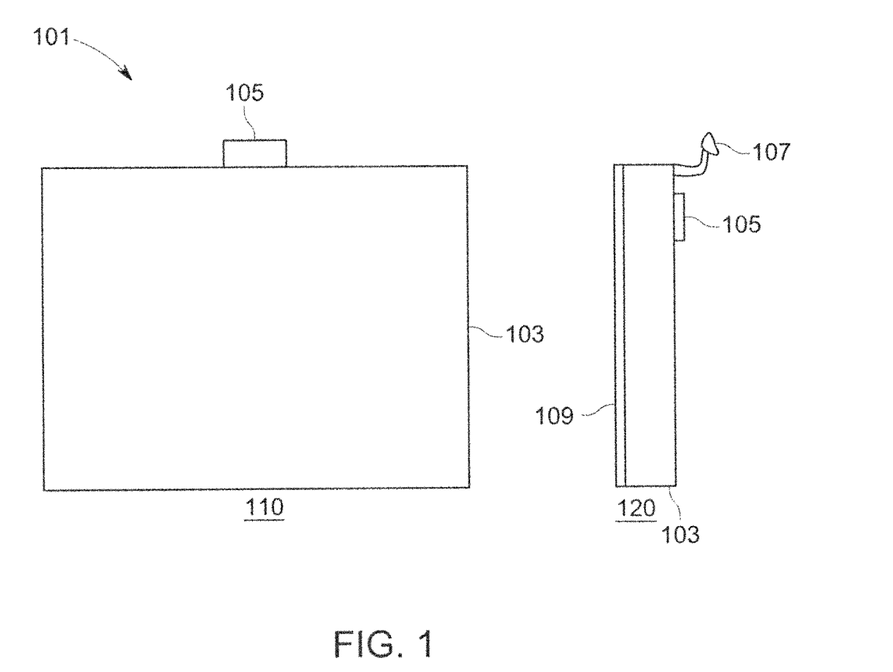
FIG. 1 illustrates a front view and a side view of a head-up display according to an embodiment.

FIG. 1 illustrates a front view 110 and a side view 120 of a head-up display according to an embodiment. As shown in FIG. 1, the head-up display 101 may include a display (which may be alternatively referred to as a display unit or display device) 103 and a camera 105. The display 103 may display content that can be viewed by one or more users. The display 103 may include a processor (such as a display driver integrated circuit (DDIC) or a display controller) and a memory (such as a cache memory) for operating the pixels of the display 103. The camera 105 may capture still or moving images. According to an embodiment, the camera 105 may include one or more lenses, image sensors, and/or image signal processors. As shown in the front view 110 of FIG. 1, the camera 105 may be mounted on top of the display 103. Alternatively, as shown in the side view 120 of FIG. 1, the camera 105 may be disposed on an outward-facing side of the head-up display 101. In either case, when the head-up display 101 is mounted in the vehicle, the iris of the camera 105 may be facing the front of the vehicle. This way, the camera 105 may be properly oriented so that it may capture one or more images of the road ahead of the vehicle.

As shown in the side view 120 in FIG. 1, the head-up display 101 may further include a hinge 107. The hinge 107 may be rotatably coupled to the display 103 so that the display 103, along with the camera 105 if the camera 105 is disposed on a surface of the display 103, may rotate about the hinge 107. Rotation of the display 103 is further explained below in connection with FIG. 2. In an alternative embodiment, the camera 105 may be mounted on the hinge 107.

According to an embodiment, the head-up display 101 may further include a communication module (not shown). The communication module may be used to establish wired or wireless communication between the head-up display 101 and an external electronic device (e.g. the electronic device 301 in FIG. 3 or an external server). The communication module may include one or more communication processors, and may include a wireless communication module such as a cellular communication module for connecting to long-range communication networks (e.g., cellular networks, the Internet, or other computer networks such as local area network (LAN) or wide area network (WAN)), a short-range wireless communication module for connecting to short-range communication networks (e.g., Bluetooth™, wireless-fidelity (Wi-Fi) direct, or infrared data association (IrDA)), and/or a global navigation satellite system (GNSS) or GPS communication module. The communication module may further include a wired communication module, such as a LAN communication module or a power line communication (PLC) module. These various types of communication modules may be implemented as a single component or as multi components separate from each other. In one embodiment, as disclosed below in connection with FIG. 3, the communication module may be used to transmit images captured by the camera 105 to the electronic device 301 in FIG. 3.

In the embodiment shown in FIG. 1, the display 103 is a transparent liquid-crystal display (LCD). A transparent LCD is advantageous because when the display 103 is in its operating position between the user and the windshield (the second position 213 shown in FIG. 2), the display 103 may display content to the user without blocking the user's view of the road ahead of the vehicle. However, the disclosed invention is not so limited. For example, in an alternative embodiment, the display 103 may be a projector, for example a pico projector, that is mounted on a surface of the vehicle such as the dashboard or the ceiling. When so mounted, the projector may project content onto a film adhered to the windshield or onto the windshield itself. This way, the projector accomplishes the same goal as the transparent LCD, i.e. the projector projects content in the field of view of the user while the user is driving (i.e. as the user keeps his or her eyes on the road) without blocking the user's view of the road.

As shown in the side view 120 of FIG. 1, in an embodiment, the head-up display 101 may further include a window film 109 that overlaps the display 103. The window film 109 may be a transparent film that reduces glare and/or ultraviolet (UV) rays incident on the user, in particular on the user's eyes. Alternatively, instead of the window film 109, the display 103 may display a screen having a semi-transparent color (e.g. light gray) to reduce glare. Accordingly, the head-up display 101 may provide a further advantage and may help the user better see the road ahead.

In an alternative embodiment, the display 103 may be embedded within the windshield of the vehicle.

Figure 2:
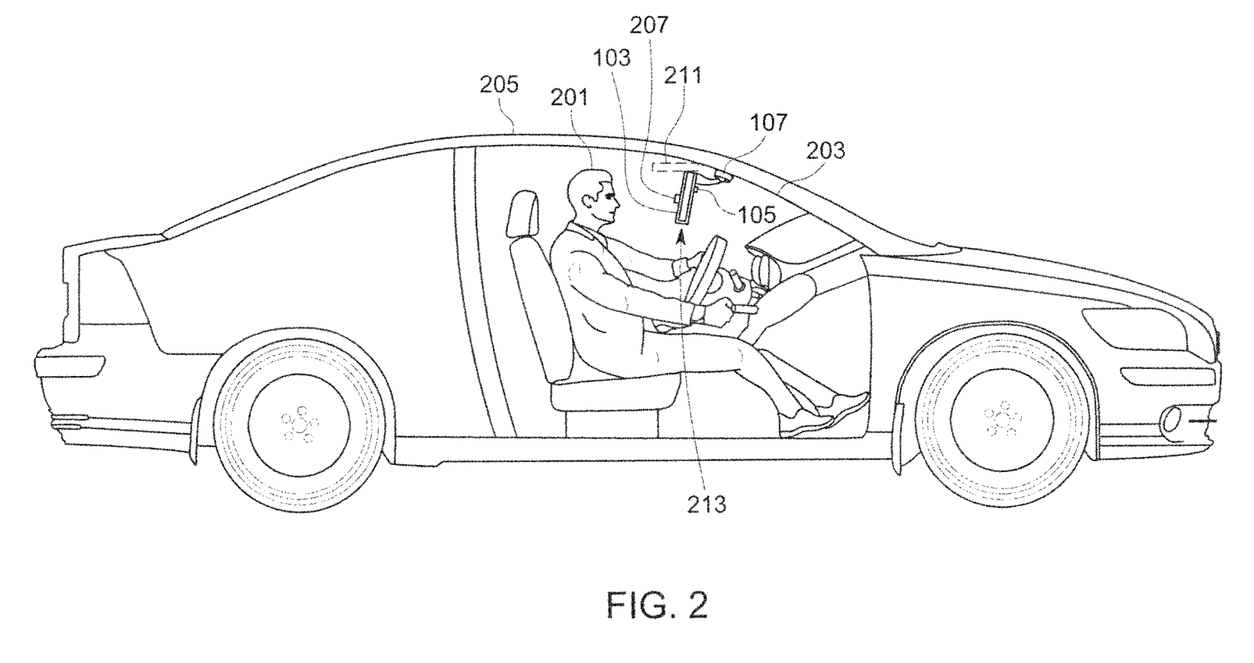
FIG. 2 is a view illustrating a head-up display according to an embodiment when it is mounted in a vehicle.

FIG. 2 is a view illustrating a head-up display according to an embodiment when it is mounted in a vehicle. As shown in FIG. 2, while operating the vehicle, i.e. driving, the user 201 may be seated in the driver's seat of the vehicle and may be looking straight ahead. The head-up display 101 may be disposed between the user 201 and the windshield 203 of the vehicle. As explained above, the head-up display 101 may include a hinge 107 that is fixed to a surface of the vehicle. In the embodiment shown in FIG. 2, the hinge is fixed to the windshield 203, and the display 103 may be rotatable about the hinge 107. Alternatively, the hinge 107 may be fixed to the ceiling 205 of the vehicle. When the head-up display 101 is not in use, it may be rotated to be in the first position 211, shown in dashed lines in FIG. 2. In the first position 211, the display direction of the display 103 is toward the roof or ceiling 205 of the vehicle, such that the user 201 will not be able to see any content displayed on the display 103. Similar to visors that commonly installed in vehicles, when not in use, the head-up display 101 may be "folded away" in the first position 211. Conversely, when in use, the head-up display 101 may be rotated to be in the second position 213. In the second position 213, the display direction of the display 103 is toward the user, such that the user 201 will be able to see the content displayed on the display 103.

In one embodiment, the head-up display 101 may be equipped with additional sensors, switches, etc. so that it is automatically deactivated when it is in the first position 211. Conversely, the head-up display 101 may be automatically activated when it is in the second position 213. For example, the head-up display 101 may include an orientation sensor (not shown). When the orientation sensor detects that the head-up display 101 is in an orientation consistent with the first position 211, it may transmit a signal to deactivate the head-up display 101. Alternatively, the head-up display 101 may be equipped with a switch 207. The head-up display 101 may be deactivated when the switch 207 is in its depressed state, and may be activated when the switch 207 is in its undepressed state. As shown in FIG. 2, the switch 207 may be disposed on the surface of the head-up display 101 facing the ceiling 205 of the vehicle when the head-up display 101 is in the first position 211. This way, when the head-up display 101 is in the first position 211, the switch 207 may be depressed by the ceiling 205, thereby causing the head-up display 101 to be deactivated. Further, the switch 207 may operate in conjunction with a compressible member (e.g. a spring, not shown) such that the compressible member exerts a force on the switch. When the head-up display 101 is rotated from the first position 211 to the second position 213, the force from the compressible member causes the switch 207 to move from its depressed state to its undepressed state. Accordingly, when the head-up display 101 is rotated from the first position 211 to the second position 213, it may be automatically activated.

Figure 3:
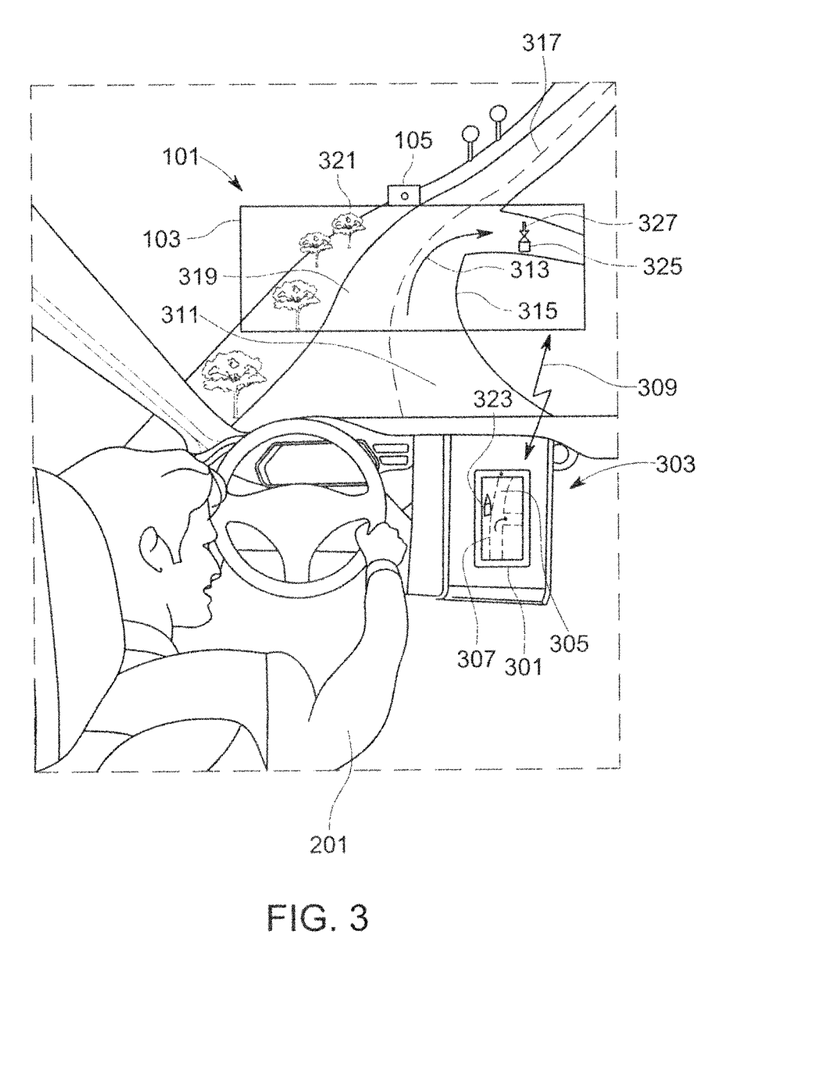
FIG. 3 is a view illustrating one or more operations of a head-up display according to an embodiment in conjunction with an electronic device.

FIG. 3 is a view illustrating one or more operations of a head-up display according to an embodiment in conjunction with an electronic device. As shown in FIG. 3, the head-up display 101 is in its second position 213 disclosed in connection with FIG. 2, so that the display direction of the display 103 is toward the user 201. Also as shown in FIG. 3, the electronic device 301, for example a smartphone or a tablet, is mounted on the dashboard 303 of the vehicle. The electronic device may include a processor and a memory. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

As shown in FIG. 3, the electronic device 301 is executing a maps application and is displaying on its display a map 305 including an indication 307 that is indicating a route between the current position of the user or the vehicle and the destination selected by the user. The maps application may be stored in the memory of the electronic device 301 and may be executed by the processor of the electronic device 301. The route may be selected by the processor executing the maps application. For example, the processor executing the maps application may display a prompt prompting the user 201 to enter a destination. Once entered, based on the current location of the user 201, the destination, and map data stored in the memory of the electronic device 301, the processor executing the maps application may select a route between the current position of the user and the destination. However, in the prior art, without the head-up display 101, to view the indication 307, the user must take his or her eyes off the road and instead direct his or her gaze toward the electronic device 301. As explained above, this is disadvantageous because when the user takes his or her eyes off the road, the risk of accidents increases.

Instead, in one embodiment of the instant disclosure, the head-up display 101 is provided. As explained in connection with FIG. 2, when the head-up display 101 is in the second position 213 as shown in FIG. 3, it may be automatically activated. When activated, the head-up display may use its communication module to automatically establish a communication connection 309 with the electronic device 301. For example, the communication connection 309 may be a Bluetooth™ connection. Once the communication connection 309 is established, the head-up display 101 may transmit one or more images captured by the camera 105 to the electronic device 301 via the communication connection 309. For example, the camera 105 may capture images of the road 311 ahead of the vehicle as framed by the display 103. The images may also include other surroundings ahead of the vehicle, such as trees and buildings on the side of the road 311. After the reception of the images, the processor of the electronic device 301 may process the images in connection with the map data stored in the memory of the electronic device 301. The processor of the electronic device 301 may process the images by correlating the images to a particular area of the map 305, i.e. a particular portion of the map data. The particular area of the map 305 may refer to an area within a predetermined distance from the current location of the user 201. For example, the particular area may be the portion of the map 305 within 100 feet of the current location. In another example, the particular area may be the portion of the map 305 currently displayed on the display of the electronic device 301. The images may be correlated to the area of the map 305 in various ways, several of which are discussed below.

Once correlated, the processor of the electronic device 301 may transmit content data to the head-up display 101 so as to control the display 103 to display the indication 313. Like the indication 307, the indication 313 indicates the route between the current position of the user or the vehicle and the destination selected by the user. But while the indication 307 is displayed on the display of the electronic device 301, the indication 313 is displayed on the head-up display 101. This way, the user can see the indication 313 without having to take his or her eyes off the road 311. In one embodiment, the indication 313 may not be completely opaque but may be displayed as a semi-transparent element, so that the indication 313 does not interfere with the user's view of the road 311. The transparency level of the indication 313 may be adjusted according to user input.

In the embodiment shown in FIG. 3, based on the correlation between the images and the particular area of the map 305, the indication 313 may be displayed to be substantially aligned with the road 311 when viewed from the front of the display, i.e. from the point of view of the user 201 while the user 201 is in the driver's seat. Here, "substantially aligned" may mean that the indication 313 is sufficiently aligned with the road 311 so that the user 201 will readily recognize that the indication 313 is directing the user 201 to drive on the road 311 and not on other roads ahead of the vehicle. For example, the indication 313 may be placed within the boundaries 315 and 317 of the road 311. In another example, the indication 313 may be placed adjacent to the boundary 317, but closer to the boundary 317 than to the center line of the other road 319. This way, the user 201 can recognize that the indication 313 corresponds to the road 311 and not to the other road 319.

As mentioned above, several ways of correlating the images captured by the camera 105 to an area of the map 305 are possible. In one embodiment, the processor of the electronic device 301 may employ image processing and artificial intelligence techniques to identify a first object 321 in the images. Next, the processor may employ data processing and artificial intelligence techniques to identify a second object 323 in the map or in the map data. The processor may then determine that the first object 321 and the second object 323 correspond to the same entity, for example, a building outside the vehicle and on the side of the road 319. The same processing can be done on additional objects in the images and the map data. Then, based on the locations of these objects in the images and the map data, the processor may correlate the images to an area of the map 305, and scale the indication 307 accordingly so that the indication 313 displayed on the display 103 is substantially aligned with the road 311. For example, the processor may scale the indication 307 so that the relative distance between the second object 323 and the indication 307 corresponds to the relative distance between the first object 321 and the indication 313.

In another embodiment, the processor of the electronic device 301 may employ Augmented Reality (AR) techniques to correlate the images from the camera 105 to an area of the map 305.

Embodiments of the instant disclosure may display additional indications on the head-up display 101 to guide the user 201. In one embodiment, the processor of the electronic device 301 may employ image processing and artificial intelligence techniques to identify a third object 325 in the images captured by the camera 105. The third object 325 may be identified as corresponding to the destination selected by the user 201. When so identified, the processor may display an indication 327 to indicate the destination. According to an embodiment, the indication 327 may have a shape that is only used to indicate destinations. For example, as shown in FIG. 3, the indication 327 may be a downward arrow. Based on the correlation of the images to an area of the map 305, the processor may display the indication 327 to be adjacent to the destination when viewed from the front of the display, i.e. from the point of view of the user 201 while the user 201 is in the driver's seat. For example, the processor of the electronic device 301 may determine a relative distance between the current location of the user 201 and the object in the map data corresponding to the third object 325. Based on the relative distance, the processor may determine a location to display the indication 327 on the head-up display 101 so that the indication 327 is displayed to be adjacent to the destination.

In another embodiment, the processor of the electronic device 301 may identify the first object 321 as a building for a particular business, for example a particular restaurant. When so identified, although not shown in FIG. 3, the processor may display the name of the restaurant on the head-up display 101. Based on the correlation of the images to an area of the map 305, the processor may display the name to be adjacent to the building when viewed from the front of the display, i.e. from the point of view of the user 201 while the user 201 is in the driver's seat.

Figure 4:
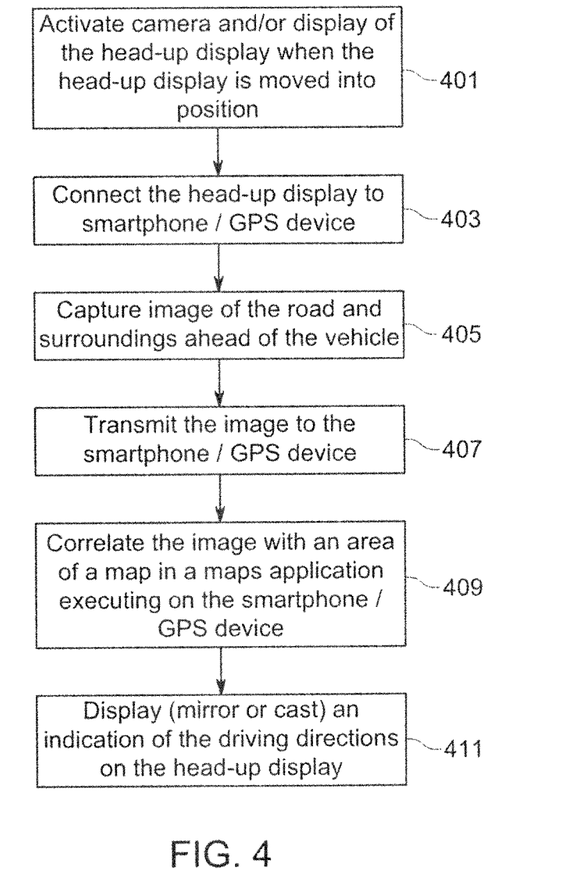
FIG. 4 is a flowchart illustrating operations of a head-up display and an electronic device according to an embodiment.

FIG. 4 is a flowchart illustrating operations of a head-up display and an electronic device according to an embodiment. In operation 401, the head-up display 101 may be automatically activated when it is moved into the second position 213 shown in FIG. 2. Activation of the head-up display 101 may include activation of the camera 105 and/or activation of the display 103.

In operation 403, the head-up display 101 may be connected to an electronic device 301 such as a smartphone, tablet, or another device having location services such as GPS. The connection may be a wireless Bluetooth™ connection.

In operation 405, the camera 105 may capture images of the road and surroundings ahead of the vehicle. As discussed in connection with FIGS. 1-2, the camera 105 may be disposed to face the front of the vehicle so that it can capture these images.

In operation 407, the head-up display 101 may transmit the images captured by the camera 105 to the electronic device 301. The images may be transmitted over the connection established in operation 403.

In operation 409, a processor of the electronic device 301 may correlate the images to an area of a map in the maps application executing on the electronic device 301, i.e. the processor may correlate the images to a portion of the map data stored in a memory of the electronic device 301. Detailed descriptions of the correlation operation is included above in connection with FIG. 3.

In operation 411, the processor of the electronic device 301 may control the display 103 to display the indication 313, as described in detail above in connection with FIG. 3. This operation may also be referred to as "mirroring" or "casting."

Figure 5:
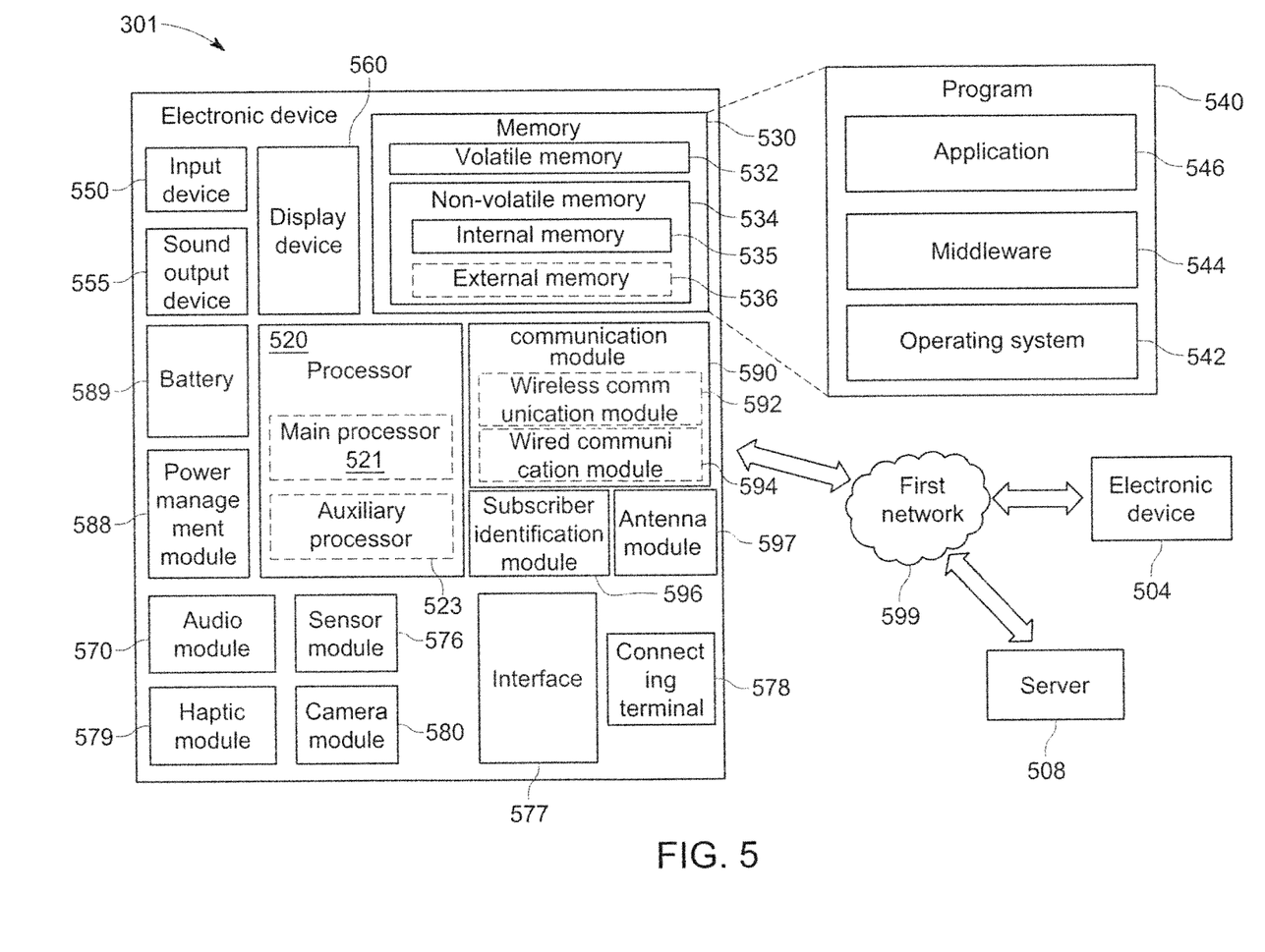
FIG. 5 is a block diagram illustrating an electronic device in a network environment according to an embodiment.

FIG. 5 is a block diagram illustrating an electronic device in a network environment according to an embodiment. For example, FIG. 5 may be a more detailed block diagram for electronic device 301 in a network environment. Referring to FIG. 5, the electronic device 301 in the network environment may communicate with an external electronic device 504 or a server 508 via a first network 599 (e.g., a long-range wireless communication network). According to an embodiment, the electronic device 301 may communicate with the external electronic device 504 via the server 508. According to an embodiment, the electronic device 301 may include a processor 520, memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, and/or an antenna module 597. In some embodiments, at least one of the components may be omitted from the electronic device 301, or one or more other components may be added in the electronic device 301. In some embodiments, some of the components may be implemented as single integrated circuitry. For example, the sensor module 576 (e.g., fingerprint sensor, iris sensor, or illuminance sensor) may be implemented as embedded in the display device 560.

The processor 520 may execute, for example, software (e.g., a program 540) to control at least one other component (e.g., a hardware or software component) of the electronic device 301, and may perform various data processing or computation. According to one embodiment, as part of the data processing or computation, the processor 520 may load a command or data received from another component (e.g., the sensor module 576 or the communication module 590) in volatile memory 532, process the command or the data stored in the volatile memory 532, and store the resulting data in non-volatile memory 534. According to an embodiment, the processor 520 may include a main processor 521 (e.g., central processing unit (CPU) or application processor (AP)), and an auxiliary processor 523 (e.g., graphics processing unit (GPU), image signal processor (ISP), sensor hub processor, or communication processor (CP)) that is operable independently from, or in conjunction with, the main processor 521. Additionally or alternatively, the auxiliary processor 523 may be adapted to consume less power than the main processor 521. The auxiliary processor 523 may be implemented as separate from, or as part of the main processor 521.

The memory 530 may store various data used by at least one component (e.g., the processor 520 or the sensor module 576) of the electronic device 301. The various data may include, for example, software (e.g., the program 540) and input data or output. The memory 530 may include the volatile memory 532 or the non-volatile memory 534. The memory 530 may further include an onboard internal memory 535 and a removable external memory 536, such as a Secure Digital (SD) Memory Card.

The program 540 may be stored in the memory 530 as software, and may include, for example, operating system (OS) 542, middleware 544, and/or application 546.

The input device 550 may include, for example, a microphone, a mouse, a keyboard, or a digital pen (e.g., a stylus pen).

The sound output device 555 may output sound signals. The sound output device 555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 560 may visually provide information to the user of the electronic device 301. The display device 560 may include, for example, a display, a hologram device, and/or a projector and control circuitry to control the display, hologram device, and/or the projector. According to an embodiment, the display device 560 may include touch circuitry adapted to detect touch inputs, and/or sensor circuitry (e.g., pressure sensor) adapted to measure the intensity of force incurred by the touch inputs.

The audio module 570 may convert sounds into electrical signals and vice versa. According to an embodiment, the audio module 570 may obtain the sound via the input device 550, and/or output the sound via the sound output device 555.

The sensor module 576 may detect an operational state (e.g., power or temperature) of the electronic device 301 or an environmental state (e.g., a state of the user) external to the electronic device 301, and then generate an electrical signal or data value corresponding to the detected state. According to an embodiment, the sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 301 to be coupled with the external electronic device 504. According to an embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 301 may be physically connected with the external electronic device 504. According to an embodiment, the connecting terminal 578 may include, for example, a HDMI connector, a USB connector, a SD card connector, or an audio connector (e.g., a headphone connector).

The haptic module 579 may convert an electrical signal into a mechanical stimulus (e.g., a vibration or a movement) or electrical stimulus which may be recognized by the user via tactile sensation. According to an embodiment, the haptic module 579 may include, for example, a motor, a piezoelectric element, or an electric stimulator.

The camera module 580 may capture still images or moving images. According to an embodiment, the camera module 580 may include one or more lenses, image sensors, image signal processors, or flashes.

The power management module 588 may manage power supplied to the electronic device 301. According to one embodiment, the power management module 588 may be implemented as at least part of, for example, a power management integrated circuit (PMIC).

The battery 589 may supply power to at least one component of the electronic device 301. According to an embodiment, the battery 589 may include, for example, a primary cell which is not rechargeable, a secondary cell which is rechargeable, or a fuel cell.

The communication module 590 may support establishing a wired communication channel or a wireless communication channel between the electronic device 301 and an external electronic device (e.g., the external electronic device 504 or the server 508) and performing communication via the established communication channel. The communication module 590 may include one or more communication processors, and may include a wireless communication module 592 such as a cellular communication module for connecting to long-range communication networks (e.g., cellular networks, the Internet, or other computer networks such as local area network (LAN) or wide area network (WAN)), a short-range wireless communication module for connecting to short-range communication networks (e.g., Bluetooth™, wireless-fidelity (Wi-Fi) direct, or infrared data association (IrDA)), and/or a global navigation satellite system (GNSS) or GPS communication module. The communication module may further include a wired communication module 594, such as a LAN communication module or a power line communication (PLC) module. These various types of communication modules may be implemented as a single component or as multi components separate from each other. In one embodiment, as disclosed above in connection with FIG. 3, the communication module 590 may be used to receive images captured by the camera 105 to the electronic device 301.

The antenna module 597 may transmit or receive signal or power to or from the electronic device 301. According to an embodiment, the antenna module 597 may include an antenna including a radiating element composed of a conductive material or a conductive pattern formed in or on a substrate (e.g., PCB). According to an embodiment, the antenna module 597 may include a plurality of antennas. In such a case, an antenna appropriate for communication in a specific type of communication network may be selected by the communication module 590.

In an alternative embodiment, components of the electronic device 301 may be integrated into the vehicle such that the head-up display 101 can communicate with a processor of the vehicle without needing a separate mobile electronic device. For example, at least the processor 520 and memory 530 may be integrated into the vehicle, and components such as the display device 560, the haptic module 579, etc. may be omitted from the electronic device 301.

In the embodiments described above, the head-up display 101 communicates with the electronic device 301, and the processor of the electronic device 301 performs operations such as the correlation operation. However, the instant disclosure is not so limited. For example, the head-up display 101 may include a processor and a memory, where the memory stores a maps application and map data, and the processor is configured to execute the maps application. In this alternative embodiment, the head-up display 101 may be configured to perform the correlation operation and display the indication 313 by itself. In this embodiment, the electronic device 301 may not be necessary.

Certain of the above-described embodiments of the instant disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The disclosed invention provides various technical advantages over conventional systems for providing driving directions. For example, one technical advantage is to provide driving directions to the user in the field of view of the user while he or she is driving, so that the user does not have to take his or her eyes off the road in order to view the directions. Another technical advantage is to display other indications, such as an indication indicating the destination or an indication indicating a name of a business, to the user in the field of view of the user while he or she is driving. Other examples may be readily ascertainable by those skilled in the art from the following figures, description, and claims.

Thus, it is apparent that there has been provided, in accordance with the instant disclosure, a system and method for providing a head-up display displaying driving directions in a vehicle that satisfy the advantages set forth above.

It should be understood that various changes, substitutions, and alterations may be readily ascertainable by those skilled in the art and may be made herein without departing from the spirit and scope of the disclosed invention as defined by the following claims.

What is claimed is:

1. A head-up display for a vehicle, comprising:
a camera configured to capture an image of a road ahead of the vehicle and in communication with a processor; and
a display in communication with the processor, wherein the processor is configured to:
select a route on a map between a current position of the vehicle and a destination selected by a user, the map stored in a memory in communication with the processor,
receive the image from the camera,
identify a first object not corresponding to the destination in the image,
identify a second object not corresponding to the destination in an area of the map,
determine that the first object and the second object correspond to each other,
correlate the image to the area of the map based on a first location of the first object in the image and a second location of the second object in the area of the map,
display an indication indicating the route on another display in communication with the processor,
scale the indication such that a first relative distance between the second object and the indication corresponds to a second relative distance between the first object and the scaled indication, and
control the display to display the scaled indication indicating the route, wherein based on correlation of the image to the area of the map using the first location and the second location, the scaled indication on the display is substantially aligned with the road when viewed from front of the display.

2. The head-up display of claim 1, further comprising a hinge to allow the display to be rotated from a first position to a second position, wherein:
in the first position, a display direction of the display is toward a roof of the vehicle, and
in the second position, the display direction of the display is toward the user.

3. The head-up display of claim 2, wherein the hinge is fixed to the roof of the vehicle or to a windshield of the vehicle.

4. The head-up display of claim 1, wherein the display is a transparent liquid-crystal display (LCD).

5. The head-up display of claim 1, wherein the display is a projector mounted on a dashboard of the vehicle and is configured to project content onto a windshield of the vehicle.

6. The head-up display of claim 1, wherein the processor is further configured to:
identify the first object in the image as corresponding to an entity outside the vehicle,
determine that the entity outside the vehicle is a business, and
control the display to display a name of the business, wherein based on the correlation of the image to the area of the map, the name of the business is displayed to be adjacent to the entity when viewed from the front of the display.

7. The head-up display of claim 1, wherein the processor is further configured to:
identify a third object in the image as corresponding to an entity outside the vehicle,
determine that the entity outside the vehicle is the destination, and
control the display to display another indication indicating the destination, wherein based on the correlation of the image to the area of the map, the other indication is displayed to be adjacent to the entity when viewed from the front of the display.

8. The head-up display of claim 1, wherein the correlation of the image to the area of the map is performed based on Augmented Reality (AR) techniques.

9. The head-up display of claim 1, further comprising a window film to reduce glare and/or ultraviolet (UV) rays incident on the user.

10. An electronic device, comprising:
a memory storing a map; and
a processor electrically connected to the memory, wherein the processor is configured to:
select a route on the map between a current position of a vehicle and a destination selected by a user,
receive an image of a road ahead of the vehicle from a camera,
identify a first object not corresponding to the destination in the image,
identify a second object not corresponding to the destination in an area of the map, determine that the first object and the second object correspond to each other, correlate the image to the area of the map based on a first location of the first object in the image and a second location of the second object in the area of the map, display an indication indicating the route on a display in communication with the processor, scale the indication such that a first relative distance between the second object and the indication corresponds to a second relative distance between the first object and the scaled indication, and control a head-up display to display the scaled indication indicating the route, wherein based on correlation of the image to the area of the map using the first location and the second location, the scaled indication on the head-up display is substantially aligned with the road when viewed from front of the head-up display.

11. The electronic device of claim 10, wherein the processor is further configured to:

identify the first object in the image as corresponding to an entity outside the vehicle, determine that the entity outside the vehicle is a business, and control the head-up display to display a name of the business, wherein based on the correlation of the image to the area of the map, the name of the business is displayed to be adjacent to the entity when viewed from the front of the head-up display.

12. The electronic device of claim 10, wherein the processor is further configured to:

identify a third object in the image as corresponding to an entity outside the vehicle, determine that the entity outside the vehicle is the destination, and control the head-up display to display another indication indicating the destination, wherein based on the correlation of the image to the area of the map, the other indication is displayed to be adjacent to the entity when viewed from the front of the head-up display.

13. The electronic device of claim 10, wherein the correlation of the image to the area of the map is performed based on Augmented Reality (AR) techniques.

14. A method for a head-up display for a vehicle, comprising:

selecting a route on a map between a current position of the vehicle and a destination selected by a user;

receiving an image of a road ahead of the vehicle from a camera of the head-up display;

identifying a first object not corresponding to the destination in the image;

identifying a second object not corresponding to the destination in an area of the map;

determining that the first object and the second object correspond to each other;

correlating the image to the area of the map based on a first location of the first object in the image and a second location of the second object in the area of the map;

displaying an indication indicating the route on a display separate from the head-up display;

scaling the indication such that a first relative distance between the second object and the indication corresponds to a second relative distance between the first object and the scaled indication; and controlling a display of the head-up display to display the scaled indication indicating the route, wherein based on correlation of the image to the area of the map using the first location and the second location, the scaled indication on the display of the head-up display is substantially aligned with the road when viewed from front of the display of the head-up display.

15. The method of claim 14, wherein the head-up display further comprises a hinge to allow the display of the head-up display to be rotated from a first position to a second position, and wherein:

in the first position, a display direction of the display of the head-up display is toward a roof of the vehicle, and in the second position, the display direction of the display of the head-up display is toward the user.

16. The method of claim 14, wherein the display of the head-up display is a transparent liquid-crystal display (LCD).

17. The method of claim 14, wherein the display of the head-up display is a projector mounted on a dashboard of the vehicle and is configured to project content onto a windshield of the vehicle.

18. The method of claim 14, further comprising:

identifying the first object in the image as corresponding to an entity outside the vehicle;

determining that the entity outside the vehicle is a business; and controlling the display of the head-up display to display a name of the business, wherein based on the correlation of the image to the area of the map, the name of the business is displayed to be adjacent to the entity when viewed from the front of the display of the head-up display.

19. The method of claim 14, further comprising:

identifying a third object in the image as corresponding to an entity outside the vehicle;

determining that the entity outside the vehicle is the destination; and controlling the display of the head-up display to display another indication indicating the destination, wherein based on the correlation of the image to the area of the map, the other indication is displayed to be adjacent to the entity when viewed from the front of the display of the head-up display.

20. The method of claim 14, wherein the correlation of the image to the area of the map is performed based on Augmented Reality (AR) techniques.

21. The method of claim 14, wherein the head-up display further comprises a window film to reduce glare and/or ultraviolet (UV) rays incident on the user.

22. A non-transitory computer-readable recording medium having recorded therein a program comprising executable instructions which, when executed by a processor, causes the processor to perform operations comprising:

selecting a route on a map between a current position of a vehicle and a destination selected by a user;

receiving an image of a road ahead of the vehicle from a camera of a head-up display;

identifying a first object not corresponding to the destination in the image;

identifying a second object not corresponding to the destination in an area of the map;

determining that the first object and the second object correspond to each other;

correlating the image to the area of the map based on a first location of the first object in the image and a second location of the second object in the area of the map;
displaying an indication indicating the route on a display separate from the head-up display;
scaling the indication such that a first relative distance between the second object and the indication corresponds to a second relative distance between the first object and the scaled indication; and
controlling a display of the head-up display to display the scaled indication indicating the route, wherein based on correlation of the image to the area of the map using the first location and the second location, the scaled indication on the display of the head-up display is substantially aligned with the road when viewed from front of the display of the head-up display.

* * * * *